3,606,467
MACHINES FOR CUTTING GROOVES IN CONCRETE AND SIMILAR ROADWAY SURFACES
Frank L. Christensen and Takeshi Mori, Salt Lake City, Utah, assignors to Christensen Diamond Products Company, Salt Lake City, Utah
Filed Aug. 19, 1969, Ser. No. 851,193
Int. Cl. E01c 23/09
U.S. Cl. 299—39                                 16 Claims

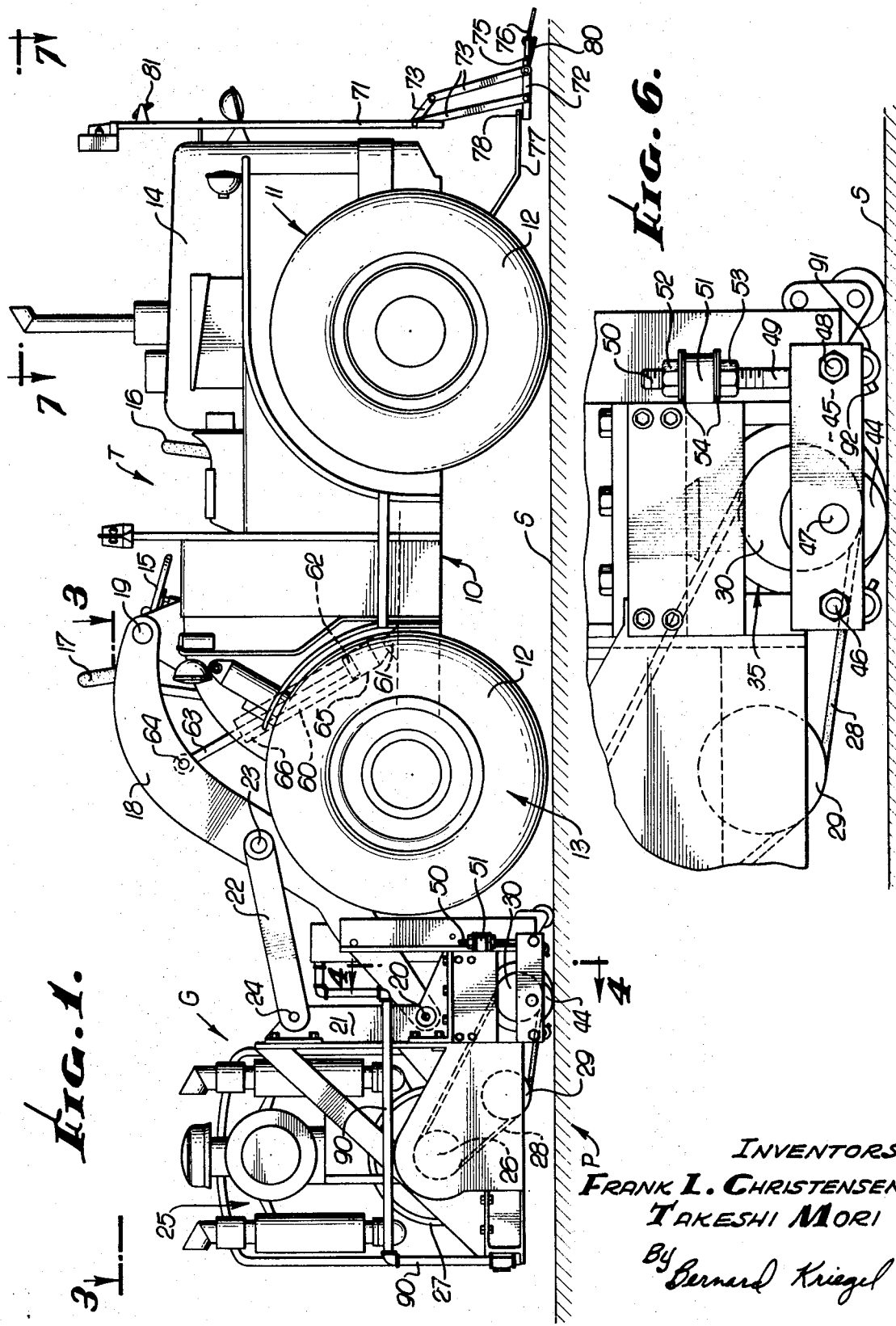

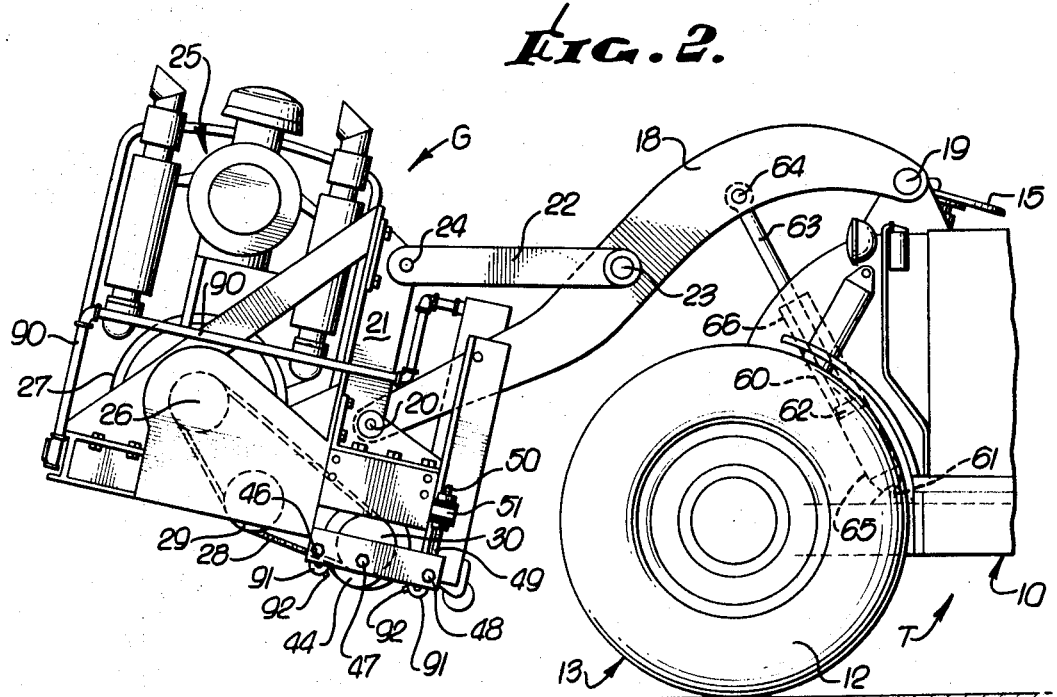
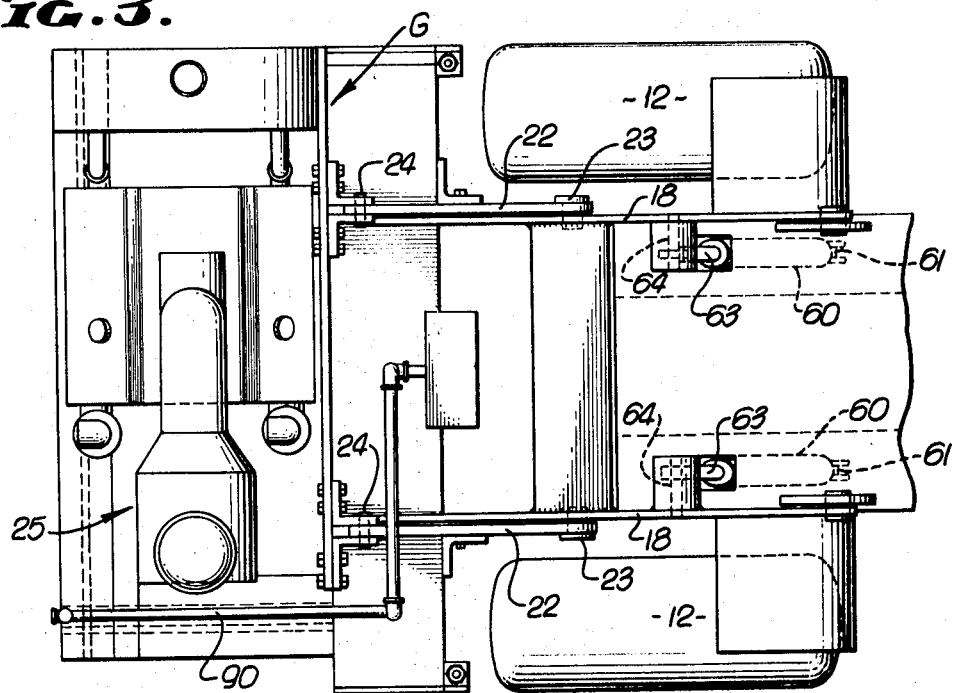

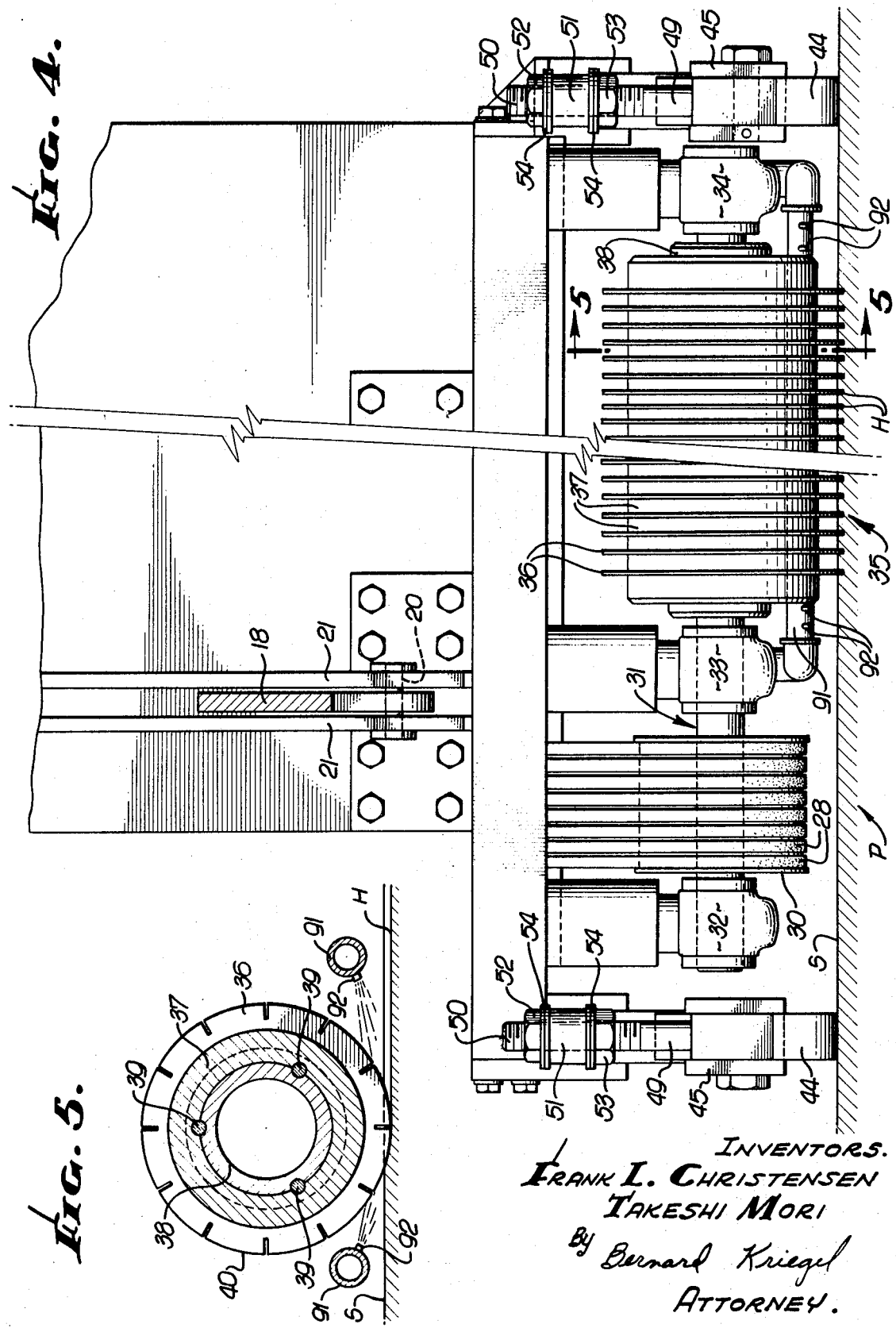

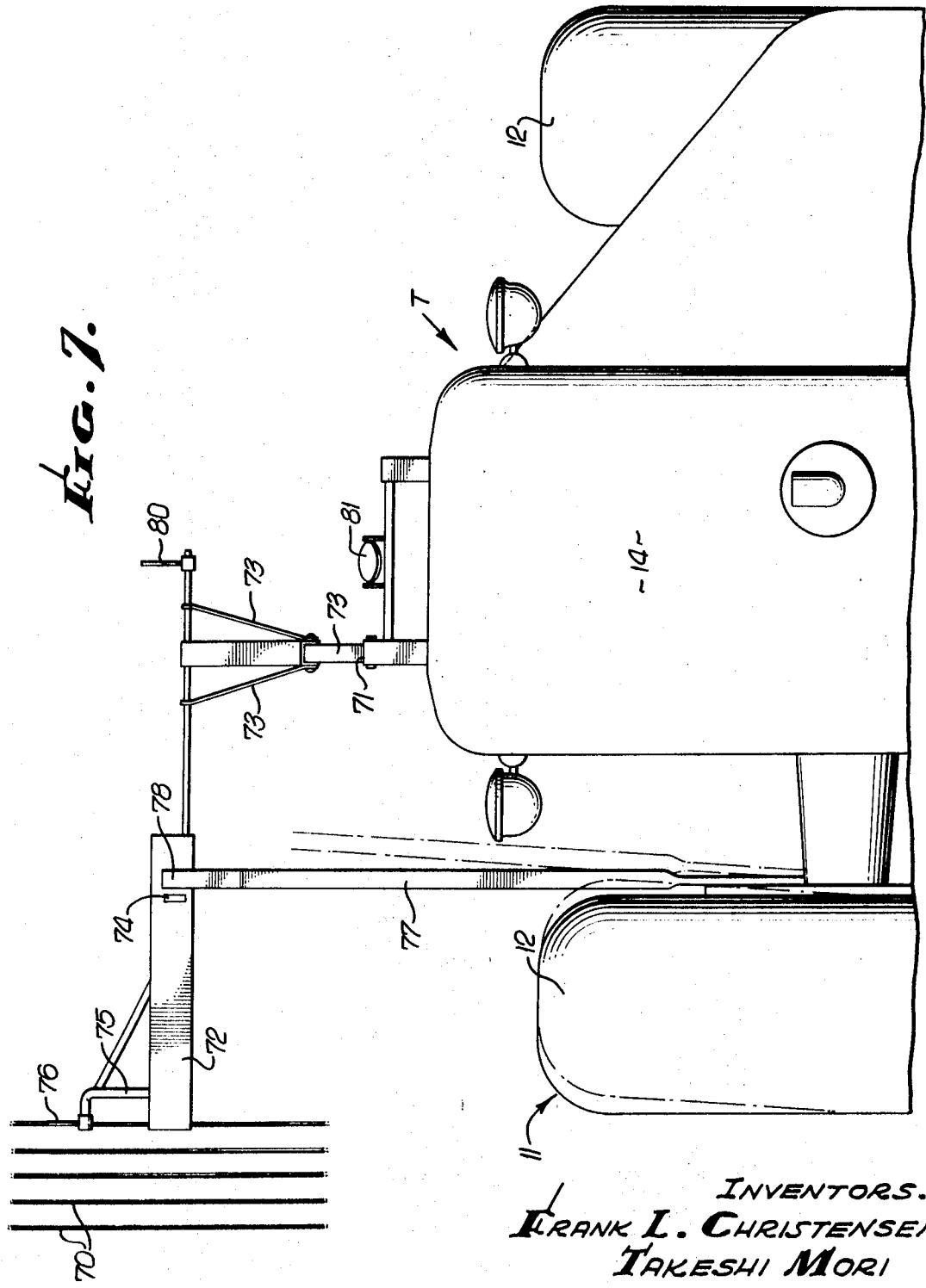

ABSTRACT OF THE DISCLOSURE

A four wheel vehicle carries a grooving unit that rotates a gang of saw discs or cutters in contact with a concrete pavement to cut parallel grooves therein to a desired depth. The grooving unit can be raised from the pavement to permit all four wheels of the vehicle to engage the roadway for transporting the vehicle rapidly between locations. The grooving unit is lowered to contact its saw discs with the pavement and elevate a pair of vehicle wheels (such as non-steerable wheels) from the pavement so that the entire weight of the vehicle and grooving unit is supported by the pavement engaging portions of the grooving unit and the other pair of steerable vehicle wheels, thereby insuring ample cutting weight and force of the saw blades against the pavement while the entire combination is moved by the powered steerable wheels along the pavement.

---

The present invention relates to apparatus for cutting parallel grooves in concrete roadway surfaces, such as in highway and airport runway surfaces, to improve traction of vehicles and aircraft wheels thereover, particularly during inclement weather.

Apparatus has been provided for cutting grooves in concrete roadway surfaces for the purpose of improving traction of vehicles moving thereover. A gang of closely spaced rotating saw blades having diamond matrix rim portions is brought to bear against the surface, while the saw blades are moved along the surface for the purpose of cutting parallel grooves therein to a desired depth, which, for example, may be about ⅛ inch. Difficulty with prior machines is their lack of sufficient weight to penetrate the saw blades into the roadway surface and to maintain the saw blades in the grooves, since they tended to elevate themselves with respect to the bottom of the grooves formed in the pavement. The securing of appropriate cutting weight resulted in the apparatus becoming extremely cumbersome and lacking in mobility, in addition to making it comparatively costly and, therefore, involving a great investment. Such machines, which lack in mobility, make it necessary to load them on trailers, or the like, for transportation to other operating locations, which involves substantial time and cost.

Prior machines or apparatus were only capable of cutting an overall grooving width of about two to three feet at a time, unless the weight of the machine was increased considerably. The result was a machine having an overall width exceeding the permissible width for transporting vehicles or objects over highways. According to United States Federal highway specifications, the overall width of a unit cannot exceed eight feet, to fit safely within a twelve foot traffic lane. Since, as a practical matter, prior machines, with a width not exceeding eight feet, only possessed adequate weight to cut a two or three foot width at a time, from five to four passes over a single highway traffic lane were required to cover a ten foot overall grooving width in a twelve foot traffic lane, since there is no requirement for cutting the outer one foot width at the sides of each traffic lane. Again, the necessity for making numerous passes to effect a ten foot overall grooving width in a twelve foot highway lane is also time consuming and, therefore costly.

By virtue of the present invention, the aforenoted disadvantages of prior machines have been overcome. A machine is provided that does not exceed the maximum width limits imposed by highway authorities, and yet is one which provides adequate weight for cutting a wider overall grooved section in the roadway in a single pass. As an example, the present machine can effect an overall five foot cutting width in producing the parallel grooves in a pavement surface, thereby requiring only two passes to effect the desired ten foot grooving width in the pavement where the traffic lane is twelve feet wide, since, as above noted, there is no requirement for grooving a foot at each side of a highway lane.

Despite the provision of a machine having adequate weight for effecting appropriate penetration of parallel rotating saw discs in the roadway surface, it is readily self-transportable over the highway, thereby making it unnecessary for the use of auxiliary equipment, such as a trailer, or the like, for shifting the mechanism to another operating location. Since it is required that the machine be absent from the work site, except during the work shift, its self-propelling capability at substantial speed effects savings of considerable time, it being unnecessary to consume time in loading and unloading the machine from a trailer, permitting the machine to be used in pavement grooving for a greater period during the work shift. However, should it prove desirable to convey the machine along a highway at a substantially greater speed than its self-propelling speed, it is capable of moving itself onto and from a trailer, since it can move at steep angles up and down the ramp of a tilt bed trailer.

The machine includes essential portions which are available on the open market, eliminating the necessity for special design and tooling expenses for the basic motive powered vehicle for propelling the machine along a highway or airport runway. The available machine, such as a rubber tired wheel loader, is modified, with the grooving mechanism added to it, the combination possessing adequate weight for effecting the grooving operation at the desired overall grooving width while the machine is being propelled at an economical speed along the roadway surface.

Another advantage and objective of the invention is to provide a machine that is shiftable between its grooving mode and its transportation mode very quickly. It is only necessary to either bring the grooving saw blades and depth-of-cut control devices into contact with the highway or airport runway surfaces, or to elevate the latter from such surface to the desired height thereabove, which transition requires only a few seconds to accomplish.

A further object of the invention is to provide a mechanism in which the depth of the grooving cut can be adjusted in a relatively rapid manner, which, for example, may require about five minutes.

Yet a further object of the invention is to provide a vehicle that possesses an infinitely variable transmission for propelling the vehicle and the cutters over the roadway surface at different speeds, which can vary widely, as, for example, at speeds of from about ten feet per minute to about fifty feet per minute, while taking a grooving cut that can vary from an eighth of an inch deep to about a quarter of an inch deep. With the provision of an infinitely variable speed transmission in the vehicle, relatively small changes in vehicle speed can be made so that the rotating cutter assembly is translated over the pavement surface at an optimum speed, for the purpose of securing maximum life from the cutting saws or blades in the time required for performing the job.

Still another object and advantage of the invention is to provide a machine that has three axles, two of such axles having rubber tires or wheels secured thereto, and the third axle comprising the rotatable cutter arbor or assembly, the mode of operation being shiftable to place either the four wheels of the vehicle in contact with the pavement, to enable the vehicle to be self-propelled relatively rapidly over the roadway surface, or to bring the rotatable saw blades and the depth control mechanism in contact with the roadway surface and to elevate one substantially coaxial pair of vehicle wheels out of contact with the roadway surface, so that the vehicle is then supported by the saw blades and depth control device and by the other pair of substantially coaxial wheels, which are steerable wheels, the overall weight of the vehicle then being shared between the steerable wheels and the rotating saw blade assembly and the depth control device in contact with the roadway surface. With either mode of operation of the vehicle, it has good steering control along the highway. When the grooving operation is taking place, the saw blades can be made to perform their grooving action along the required portion of the roadway surface.

Another object of the invention is to provide a comparatively simple and effective system for enabling the operator of the vehicle to steer it accurately along the roadway surface during the cutting of grooves therein.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 1 is a side elevational view of a machine embodying the invention, with one pair of its wheels elevated from a roadway surface, and with its cutter assembly in engagement therewith;

FIG. 2 is a side elevational view of the rear portion of the machine disclosed in FIG. 1, illustrating the grooving mechanism elevated from contact with the roadway surface and with the coaxial wheels adjacent thereto reengaged with the roadway surface;

FIG. 3 is a top plan view of a portion of the machine taken along the line 3—3 on FIG. 1;

FIG. 4 is an enlarged section taken along the line 4—4 on FIG. 1;

FIG. 5 is a cross-section taken along the line 5—5 on FIG. 4;

FIG. 6 is an enlarged side elevational view of a portion of the grooving mechanism illustrated in FIG. 1;

FIG. 7 is an enlarged top plan view of the forward portion of the vehicle, illustrating its guidance system.

The machine for grooving concrete and similar pavements P, illustrated in the drawings, includes a four-wheeled vehicle T, which may be of a conventional wheel loader type, manufactured by Caterpillar Tractor Co., and having a main frame or chassis 10 with one set or pair of steerable wheels 11 including pneumatic rubber tires 12, which, for convenience, may be referred to as steerable front wheels, and another set or pair of wheels 13 including rubber tires 12, which, for convenience, may be referred to as rear wheels. The unit has the usual internal combustion engine 14, such as a diesel engine, that drives through a torque converter or other infinitely variable ratio transmission (not shown) to both the front and rear wheels, to effect a four-wheel drive. The steerable wheels 11 are steered through a known mechanism by appropriate turning of a steering wheel 15, which may be manipulated by the driver sitting in the usual seat 16 when the vehicle is to be conveyed at a relatively rapid rate over the road between locations, or the steering wheel may be manipulated by the driver sitting in another seat 17 facing toward the steerable wheels 11, when the vehicle is to be used in the performance of a pavement grooving operation.

A pair of spaced swingable arms 18 are pivotally connected at their forward end portions to the upper part of the frame or chassis 10 by hinge pins 19, the rear lower ends of these arms being connected by pins 20 to the movable frame 21 of the grooving unit G of the machine. A pair of spaced apart upper arms 22 are also connected by forward connector pins 23 to the swing arms 18 and by rear connector pins 24 to the movable frame 21 of the highway grooving unit. Arms similar to the upper arms 22 and the lower portions of the swingable arms 18 had been connected to the bucket portion (not shown) of the wheel loader machine or tractor T, but such blade portion has been removed and the movable frame 21 of the grooving unit G substituted in its place.

The movable frame 21, which is disposed behind the rear wheels 13 of the machine, carries an internal combustion engine 25, such as a diesel engine, the crankshaft 26 of which rotates a peripherally grooved drive pulley 27 around which a plurality of V-belts 28 pass, such V-belts also passing over an idler peripherally grooved pulley 29 suitably rotatably mounted on the movable frame 21, and also over a peripherally grooved driven pulley 30 which is suitably fixed to a transverse drive shaft structure 31 (FIG. 4) supported by one side of the frame 21 by a pair of bearing supports 32, 33 suitably fixed to the frame, and also by a third bearing support 34 suitably secured to the frame at the opposite end portion of the drive shaft assembly 31. Between the second and third bearing supports 33, 34, the drive shaft assembly is suitably fixed to a saw blade assembly 35 comprising a plurality of saw discs of cutters 36 separated by spacers 37 and clamped to a mandrel 38 suitably attached to the drive shaft structure, the entire assembly being clamped together by a plurality of elongate key bolts 39 passing through the saw blade assembly (FIG. 5). The rim portion 40 of each saw blade comprises a matrix of diamonds and other materials for effectively cutting into the concrete roadway surface. The saw blade or cutter assembly 35 may assume any required form. One such assembly is illustrated and described in the patent application of Warren J. Hughes and Donald H. Mabey, Ser. No. 788,838, filed Jan. 3, 1969, for "Rotary Cutter Assembly."

The depth of penetration of the saw blades 36 into the roadway surface, that is to say, the depth of cut of the parallel saw blades in producing the grooves H in the roadway surface, is determined by a pair of depth-of-cut rollers 44 located at opposite sides of the movable frame 21. Thus, a support arm 45 is pivotally mounted on the frame 21 at each of its sides by a pivot pin 46, each arm having an axle 47 rotatably mounting a depth-of-cut roller 44 engageable with the roadway or airport runway surface S. The end of the support arm 45 opposite the pivot pin 46 is connected, by means of a pin 48, to a generally vertical adjustable rod or shaft 49 having an upper threaded portion 50 passing through a boss 51 fixed to the movable frame 21. Threadedly mounted on the threaded shaft portion 50 and above and below the boss 51 are nuts 52, 53 bearing against washers 54 engaging the upper and lower surfaces of the boss. Appropriate turning of the nuts 52, 53 at each side of the frame will effect vertical adjustment of the shafts 49 to move the forward ends of the support arms 45 up or down and shift the axes of the depth-of-cut rollers 44 with respect to the axis of the shaft 47. The rollers are located the desired distance above the lower peripheries of the saw blades 36, thereby determining the depth of penetration of the saw blades or cutters into the roadway surface S, which determines the depth of the grooves H cut into such surface. Following adjustment of the depth-of-cut rollers 44, the nuts 52, 53 are retightened against the washers 54 and the washers against the upper and lower sides of the bosses 51 to retain the depth-of-cut rollers in the position to which they have been adjusted.

The movable frame 21 and the saw blade assembly 35 and depth-of-cut rollers 44 carried thereby are shiftable as a unit in a vertical direction to bring the saw discs 36 and rollers 44 into and out of engagement with the pavement surface S. As illustrated, the actuating mechanism includes a pair of laterally spaced cylinders 60 having their lower ends connected by hinge pins 61 to the frame or chassis 10 of the wheel loader vehicle T. Each cylinder has a piston 62 slidable therein and secured to a piston rod 63 extending from the upper end of the cylinder and connected by a pin 64 to a swingable arm 18. The introduction of fluid under pressure into the head or lower ends 65 of the cylinders will shift the pistons 62 and piston rods 63 upwardly to swing the arms 18 and the entire movable frame 21 upwardly with respect to the roadway or pavement surface S. On the other hand, the bleeding of fluid under pressure from the head ends 65 of the cylinders and the introduction of such fluid under pressure into the upper or rod ends 66 of the cylinders will effect retraction of the piston rods 63 into the cylinders and downward movement of the swingable arms 18 and the movable frame 21 to bring the depth-of-cut rollers 44 and the saw blades 36 downwardly. Prior to lowering of the unit G, rotation of the saw blade assembly 35 by the internal combustion engine 25 on the movable frame is initiated, operating through the pulley and belt drive mechanism 27–30. The continued application of fluid under pressure into the rod ends 66 of the cylinders 60, after the saw blades 36 have contacted the pavement surface S, will effect elevation of the rear of the frame or chassis 10 and the elevation of the rear wheels 13 from the pavement surface, as disclosed in FIG. 1. As a result, weight of the entire machine is then being shared by the steerable wheels 11 and by the rotating saw blades 36 and depth-of-cut rollers 44, which are in contact with the pavement surface S.

The usual weight of the wheel loader type of mechanism T to which the movable frame 21, saw blade assembly 35, and depth-of-cut roller mechanism has been secured is quite large, and more than adequate for insuring penetration of the cutter 36 into the roadway surface S to the desired depth, with the depth-of-cut rollers 44 engaging the roadway surface to limit the extent of penetration of the saw blades into the pavement or concrete roadway P. The weight is more than ample for permitting relatively closely spaced saw blades 36 to be used, having an overall assembled width of five feet. For example, the blades 36 may be about twelve inches in diameter and have a center-to-center spacing from each other of about one inch. In other words, efficient penetration of the saw blades 36 into the pavement surface to the desired depth is effected when the assembly comprises about 60 blades rotating as a unit, the distance between the outermost blades being about five feet.

As stated above, the internal combustion engine 25 has been started and is rotating the saw blade assembly 35 prior to lowering of the latter into engagement with the roadway surface S by suitable introduction of hydraulic fluid into the rod ends 66 of the cylinders 60. The hydraulic fluid circuit is well known, being the same as that employed with a bucket blade secured to the upper arms 22 and swingable arms 18 in place of the movable frame 21 illustrated in the drawings. Since the hydraulic system is known, it has not been illustrated in the drawings. With the rotating cutters 36 and depth-of-cut rollers 44 in contact with the pavement surface S, and with the rear wheels 13 elevated from contact therewith, the vehicle T is caused to move over the roadway surface in a forward direction, all four wheels 11, 13 being driven, the rear wheels 13 merely rotating freely, with the driving effort being transmitted through the front wheels 11 and their tires 12 to the pavement surface S, which exerts all of the drawbar pull necessary to traverse the vehicle T and the saw blades 36 along the roadway or pavement surface at the required speed. The operator sits in the grooving seat 17 and adjusts the over-the-pavement speed desired, manipulating the steering wheel 15 as required to maintain the entire machine and the saw discs 36 travelling in the desired direction.

Assuming the mechanism is being used for grooving highway lanes to improve vehicle tire traction thereon, a highway lane will be delineated by suitable highway paint stripes or by grooves 70 or lane markings at each side of a lane (FIG. 7). A guidance mechanism (FIGS. 1 and 7) is provided at the forward end of the vehicle in a position readily observable by the machine operator to insure that the grooving operation takes place in a fixed and predetermined relation to the lane markings 70. As shown, a vertical standard 71 is suitably secured to the vehicle T generally in front of the side thereof where the grooving seat 17 is located in an elevated position. This standard supports a horizontal frame extension member 72 through pin-connected links 73, the member 72 having a fixed reference mark 74 or "dead-ahead" mark thereon. The member 72 extends laterally to one side of the vehicle, having a guide arm 75 projecting forwardly therefrom to which a guide pointer 76 is affixed, that is positionable by the vehicle over or adjacent to the lane marking groove 70 or paint stripe to be followed as a reference line. Suitably secured to a stationary portion of the steerable part of the vehicle, to move as the wheels 11 are steered, is a reference pointer 77, the forward end 78 of which extends over the member 72 and cooperates with the fixed reference mark 74 on the member 72. With the guide pointer 76 appropriately located over the guide groove 70 or lane marking, and with the forward end 78 aligned with the reference mark 74, the vehicle is moving in a "dead-ahead" direction parallel to the lane marking 70 to position the outermost saw blade on the same side of the vehicle that has the reference point 77 a fixed distance from the lane marking, which, as noted above, may be one foot, to cause the saw discs to cut the grooves H in the pavement along the desired path. Deviations from such path will be indicated by misalignment between the reference pointer 77 and mark 74, the operator steering the vehicle to bring the pointer 77 and mark 74 into realignment, with the guide pointer positioned over the lane marking 70.

If desired, another pointer 80 may be secured to the transverse frame extension member 72 in front of the vehicle and which cannot be seen directly by the operator. Such pointer 80, however, can be viewed by him by looking at a mirror 81 suitably supported at the forward portion of the vehicle and disposed at an appropriate angle, such that the guidance device 77, 74 and the image of the pointer 80 and reference line on the pavement below the pointer 80 being followed by him can be viewed, to enable the operator to steer the vehicle in the appropriate direction.

At the end of a grooving cut, the operator need merely stop the vehicle and direct hydraulic fluid under pressure to the head ends 65 of the cylinders 60 to extend the piston rods 63 from their upper ends, thereby swinging the arms 18 upwardly to carry the entire movable frame mechanism 21 together with the saw blades 36 and the depth-of-cut rollers 44 substantially upwardly from the pavement surface S, as illustrated in FIG. 2, the rear wheels 13 recontacting the roadway or pavement surface. The vehicle can now be propelled at a relatively rapid rate to another location, which, for example, may be at the rate of about 15 to 25 miles per hour. The wheel loader or tractor unit T, with all four wheels in contact with a surface, is capable of being self-propelled along steep inclinations, which renders it capable of moving up and down trailer ramps so as to self-load itself onto and from a trailer, in the event that it is desired to transport the machine to a new location at a much faster speed than it is capable of travelling itself, which, for example, may be substantially in excess of 25 miles per hour.

The wheel loader type of vehicle which the present invention utilizes in conjunction with the cutter assembly has great weight. Such weight is further increased by the very substantial weight of the movable frame 21, and the motive power device 25, transmission and cutter assembly mounted thereon. The entire machine, despite its great weight, does not exceed eight feet in width, enabling it to be moved over highways within existing governmental highway regulations. Its substantial weight enables a large multiplicity of saw blades or cutters to be used for taking an overall substantial cutting width, which, in the example given, is five feet, with assurance that the cutters will not tend to climb out of the grooves H being cut, and thereby producing pavement grooves that have a uniform depth throughout their extent. The horsepower available in the internal combustion engine 25 for rotating the cutter assembly and the horsepower of the internal combustion engine 14 for propelling the vehicle over the roadway surface is more than adequate for the job to be performed. The infinitely variable ratio transmission (not shown), which forms a part of the wheel loader vehicle as purchased, permits the movement of the cutter assembly along the roadway surface in performing its grooving action at the appropriate linear highway speed for most effective cutter operation, which permits the cutters 36 to have a maximum life. During the cutting operation, the cuttings are flushed from the cutting region and the cutters are maintained in a clean and cool condition by flushing water, the supply of which is connected to suitable piping 90 mounted on the movable frame and which runs to a pair of headers 91 on opposite sides of the cutter assembly 35, discharging through a plurality of nozzles 92 onto the roadway surface S and the cutters themselves.

The machine is operable at a lower cost and for a longer period of time during a work shift than prior machines, as well as being self-transportable between locations, all of which effects great economies in use of the apparatus.

We claim:

1. In a machine for cutting grooves in a roadway surface traversed by vehicles: a vehicle having a main frame and roadway engaging wheels carried by said main frame, said vehicle including drive means for one or more of said wheels; a movable frame connected to said main frame and movable vertically with respect thereto; cutter means carried by said movable frame for cutting grooves in the roadway surface; means for driving said cutter means to cut the grooves; and means operatively connected between said main frame and movable frame for moving said cutter means selectively into and from engagement with the roadway surface, said moving means being operable to lift a portion of said main frame to raise at least one of said wheels from load supporting engagement with the roadway surface and thereby apply part of the the weight of the vehicle to said cutter means when said cutter means is engaged with the roadway surface and with said drive means driving one or more wheels remaining in load supporting engagement with the roadway surface, said moving means effecting re-engagement of said one wheel with the roadway surface upon elevation of said cutter means from the roadway surface; and means for steering at least one of said wheels remaining in load supporting engagement with the roadway surface.

2. In a machine as defined in claim 1; means operatively associated with said cutter means for limiting the depth of cut of said cutter means in the roadway surface.

3. In a machine as defined in claim 1; means operatively associated with said cutter means for limiting the depth of cut of said cutter means in the roadway surface, said limiting means including rollers engageable with the roadway surface.

4. In a machine as defined in claim 1; said cutter means comprising a plurality of adjacent rotatable cutter elements; said driving means being adapted to rotate said cutter elements; and means for limiting the depth of cut of said cutter elements in the roadway surface.

5. In a machine as defined in claim 1; said cutter means comprising a plurality of adjacent rotatable cutter elements; said driving means being adapted to rotate said cutter elements; means for limiting the depth of cut of said cutter elements in the roadway surface, said limiting means including rollers engageable with the roadway surface, and means for adjusting the vertical position of said rollers with respect to the axis of said cutter elements to adjust the depth of cut of said cutter elements in the roadway surface.

6. In a machine for cutting grooves in a roadway surface traversed by vehicles: a vehicle having a roadway engaging set of forward wheels and a roadway engaging set of rear wheels and including drive means for at least one of said sets of wheels; a frame connected to said vehicle and movable vertically with respect thereto; cutter means rotatably mounted on said frame; means for rotating said cutter means to cut grooves in the roadway surface; means operatively connected between said vehicle and frame for moving said frame vertically to selectively elevate said cutter means from the roadway surface or to shift said cutter means into engagement with the roadway surface and elevate a set of wheels from load supporting engagement with the roadway surface, whereby the weight of the frame and a portion of the weight of the vehicle are applied to said cutter means; said vehicle, frame and cutter means being moved along the roadway surface by said drive means rotating the set of wheels remaining in engagement with the roadway surface; and means for steering said set of wheels remaining in engagement with the roadway surface.

7. In a machine as defined in claim 6; said means for rotating said cutter means comprising a prime mover carried by said frame, and transmission means between said prime mover and cutting means.

8. In a machine as defined in claim 6; and means carried by said frame and engageable with the roadway surface for limiting the depth of cut of said cutter means in the roadway surface.

9. In a machine as defined in claim 6; and means carried by said frame and engageable with the roadway surface for limiting the depth of cut of said cutter means in the roadway surface, said limiting means including rollers engageable with the roadway surface, and means for adjusting the vertical position of said rollers with respect to the axis of said cutter means to change the depth of cut of said cutter means in the roadway surface.

10. In a machine as defined in claim 6; said cutter means comprising a plurality of adjacent saw discs; said means for rotating said cutter means comprising a prime mover carried by said frame, and transmission means between said prime mover and cutter means; means carried by said frame and engageable with the roadway surface for limiting the depth of cut of said saw discs in the roadway surface; said limiting means including rollers engageable with the roadway surface, and means for adjusting the vertical position of said rollers with respect to the axis of said saw discs to change the depth of cut of said saw discs in the roadway surface.

11. In a machine as defined in claim 6; and guidance means on said vehicle for enabling the operator of the vehicle to cause the vehicle to traverse the roadway along a predetermined path.

12. In a machine for cutting grooves in a roadway surface traversed by vehicles: a vehicle having a roadway engaging set of steerable forward wheels and a roadway engaging set of rear wheels, said vehicle including drive means for rotating at least said steerable forward wheels; a frame connected to said vehicle and extending rearwardly of said rear wheels and being movable vertically with respect to said vehicle; cutter means rotatably carried by said frame; means for rotating said cutter means to cut grooves in the roadway surface; means operatively connected between said vehicle and frame for moving said frame vertically to selectively elevate said cutter means from the roadway surface or to shift said cutter means into engagement with the roadway surface and elevate said rear wheels from load supporting engagement with the roadway surface, whereby a portion of the weight of the frame and the weight of the rear portion of the vehicle are applied to said cutter means; said vehicle, frame and cutter means being adapted to be moved along the roadway surface by the drive means rotating said forward wheels and with said cutter means engaged with the roadway surface and said rear wheels elevated therefrom.

13. In a machine as defined in claim 12; said means for rotating said cutter means comprising a prime mover carried by said frame, and transmission means between said prime mover and cutter means.

14. In a machine as defined in claim 12; means carried by said frame and engageable with the roadway surface for limiting the depth of cut of said cutter means in the roadway surface, said limiting means including rollers engageable with the roadway surface, and means for adjusting the vertical position of said rollers with respect to the axis of said cutter means to change the depth of cut of said cutter means in the roadway surface.

15. In a machine as defined in claim 12; said cutter means comprising a plurality of adjacent saw discs; means for steering said forward wheels; said means for rotating said cutter means comprising a prime mover carried by said frame, and transmission means between said prime mover and cutter means; means carried by said frame and engageable with the roadway surface for limiting the depth of cut of said saw discs in the roadway surface, said limiting means including rollers engageable with the roadway surface; and means for adjusting the vertical position of said rollers with respect to the axis of said saw discs to change the depth of cut of said saw discs in the roadway surface.

16. In a machine as defined in claim 12; said cutter means comprising a plurality of adjacent saw discs; means for steering said forward wheels; said means for rotating said cutter means comprising a prime mover carried by said frame, and transmission means between said prime mover and cutter means; means carried by said frame and engageable with the roadway surface for limiting the depth of cut of said saw discs in the roadway surface, said limiting means including rollers engageable with the roadway surface; means for adjusting the vertical position of said rollers with respect to the axis of said saw discs to change the depth of cut of said saw discs in the roadway surface; and guidance means on said vehicle for enabling the operator of the vehicle to cause the vehicle to traverse the roadway along a predetermined path with said saw discs in engagement with the roadway surface.

References Cited
UNITED STATES PATENTS

| | | | |
|---|---|---|---|
| 2,874,948 | 2/1959 | Bjorkman et al. | 299—39X |
| 3,156,231 | 11/1964 | Harding | 173—24X |
| 3,357,745 | 12/1967 | Cooper | 299—39 |
| 3,464,737 | 9/1969 | Haase et al. | 299—39 |

ERNEST R. PURSER, Primary Examiner

U.S. Cl. X.R.

173—24